United States Patent
Fuehrer

(10) Patent No.: US 10,315,564 B2
(45) Date of Patent: Jun. 11, 2019

(54) METHOD AND DEVICE FOR OPERATING A MOTOR VEHICLE, MOTOR VEHICLE

(71) Applicant: Robert Bosch GmbH, Stuttgart (DE)

(72) Inventor: Thomas Fuehrer, Stuttgart-Weilimdorf (DE)

(73) Assignee: ROBERT BOSCH GMBH, Stuttgart (DE)

(*) Notice: Subject to any disclaimer, the term of this patent is extended or adjusted under 35 U.S.C. 154(b) by 277 days.

(21) Appl. No.: 15/210,057

(22) Filed: Jul. 14, 2016

(65) Prior Publication Data

US 2017/0015241 A1    Jan. 19, 2017

(30) Foreign Application Priority Data

Jul. 17, 2015  (DE) .................. 10 2015 213 545

(51) Int. Cl.
| | |
|---|---|
| *B60Q 9/00* | (2006.01) |
| *G07C 5/00* | (2006.01) |
| *B60W 10/18* | (2012.01) |
| *B60W 10/30* | (2006.01) |
| *G07C 5/08* | (2006.01) |
| *G08B 5/36* | (2006.01) |
| *G08B 3/10* | (2006.01) |

(52) U.S. Cl.
CPC .............. *B60Q 9/00* (2013.01); *B60W 10/18* (2013.01); *B60W 10/30* (2013.01); *G07C 5/008* (2013.01); *G07C 5/0841* (2013.01); *B60W 2710/18* (2013.01); *B60W 2710/20* (2013.01); *G08B 3/10* (2013.01); *G08B 5/36* (2013.01)

(58) Field of Classification Search
CPC ........ B60Q 9/00; G07C 5/0841; G07C 5/008; B60W 10/30; B60W 10/18; B60W 2710/18; B60W 2710/20; G08B 5/36; G08B 3/10
USPC .......................................... 701/70
See application file for complete search history.

(56) References Cited

U.S. PATENT DOCUMENTS

| | | | |
|---|---|---|---|
| 6,507,016 B1 * | 1/2003 | Cooper ............... | B60R 21/013 180/282 |
| 9,767,625 B1 * | 9/2017 | Snyder ............... | B60R 21/0132 |
| 2007/0107969 A1 * | 5/2007 | Ootani ............... | B60N 2/0232 180/282 |
| 2008/0303254 A1 * | 12/2008 | Le ..................... | B60R 21/0132 280/735 |
| 2010/0324774 A1 * | 12/2010 | Bouni ................ | B60R 21/0152 701/31.4 |

* cited by examiner

*Primary Examiner* — Muhammad Shafi
(74) *Attorney, Agent, or Firm* — Norton Rose Fulbright US LLP; Gerard Messina

(57) ABSTRACT

A method for operating a motor vehicle, in which an imminent rollover of the motor vehicle is detected, depending on the status values of the motor vehicle, at least one countermeasure being initiated and/or at least one warning message being output when an imminent rollover is detected. It is provided that, when an imminent rollover is detected, at least one of the instantaneous status values and/or the warning message is/are transmitted to a central database, where it is/they are made available for other motor vehicles.

6 Claims, 1 Drawing Sheet

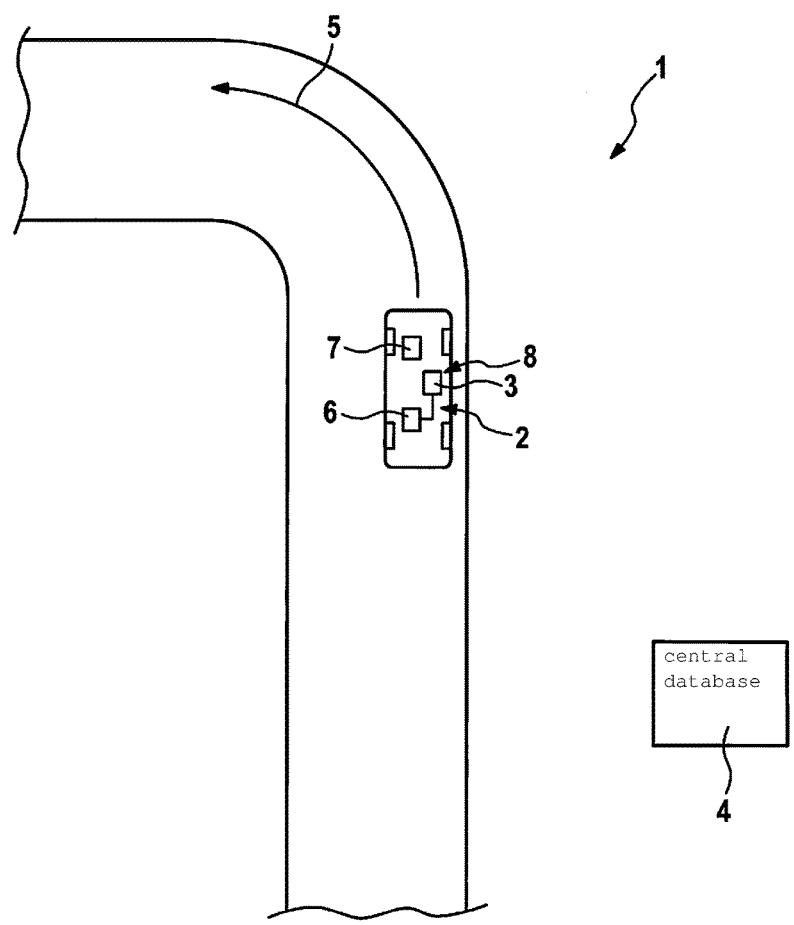

METHOD AND DEVICE FOR OPERATING A MOTOR VEHICLE, MOTOR VEHICLE

CROSS REFERENCE

The present application claims the benefit under 35 U.S.C. § 119 of German Patent Application No. DE 102015213545.4 filed on Jul. 17, 2015, which is expressly incorporated herein by reference in its entirety.

FIELD

The present invention relates to a method for operating a motor vehicle, in which an imminent rollover is detected, depending on instantaneous status values of the motor vehicle, at least one countermeasure being initiated and/or at least one warning message being output when an imminent rollover is detected.

Furthermore, the present invention relates to a device for operating such a motor vehicle, including a control unit, which detects an imminent rollover, depending on instantaneous status values of the motor vehicle, and when an imminent rollover is detected, at least one countermeasure is initiated and/or at least one warning message is output.

In addition, the present invention relates to a safety system for a motor vehicle, including the rollover protection device described above and a central database.

BACKGROUND INFORMATION

Conventional safety systems, which should prevent accidents and in particular rollovers of motor vehicles, are often used in vehicles, which have a comparatively high center of gravity such as trucks or pickup trucks, for example. These systems detect whether there is an imminent rollover of the motor vehicle on the basis of rotational and acceleration data of the motor vehicle. If an imminent rollover is detected, then countermeasures such as targeted triggering of a braking system (ESP control) or an intervention into the steering, for example, is initiated. Simultaneously or alternatively, such rollover protection systems output a warning message to the driver of the motor vehicle acoustically or visually, for example, so that the driver himself may initiate corresponding countermeasures.

SUMMARY

An example method according to the present invention may have an advantage that, when an imminent rollover is detected, vehicle status data relating to reaching this rollover situation are also made available for other drivers or for evaluation of the hazardous nature of various routes, so that, on the one hand, the motor vehicles themselves may be optimized with respect to the rollover protection function in particular and, on the other hand, the routes may be improved, for example, at the location where rollover warning messages are frequently output. According to an example embodiment of the present invention, when an imminent rollover is detected, at least one of the status values and/or the at least one warning message is output to a central database, where it is made available for further processing. In particular, together with the status value and/or warning message, vehicle position data are transmitted to the database, so that the status values and/or the warning message may be assigned to a location on a virtual map and/or a global satellite navigation system. Therefore, routes where imminent rollovers occur more frequently may be detected easily. The advantageous method thus offers not only safety advantages with respect to one's own vehicle, but also an increased benefit for other motor vehicles and route planners, for example.

It is preferably provided that position coordinates, a vehicle's driving speed, steering angle and/or a route traveled is/are preferably detected as the instantaneous status data of the motor vehicle and sent to the central database accordingly. The more various data are thus detected and sent to the database, the more accurately it is then possible to ascertain what resulted in the imminent rollover or, in the worst case, the rollover which actually occurred. Accordingly the road surface may be optimized better or the attention of following vehicles may be drawn to an increased risk of rollovers.

Furthermore, it is preferably provided that additional data on the surroundings of the vehicle, in particular weather data, time of day, roadway condition and/or season are detected and sent to the central database. Thus, data which are not derived from the driving style of the driver of the motor vehicle and which also have an influence on the rollover risk are also taken into account. A rollover may thus be more likely in one case and less likely in another case, for example, depending on different roadway conditions with the same driving behavior of the driver of the motor vehicle.

Furthermore, it is preferably provided that vital data on the driver of the motor vehicle are additionally detected and the vehicle type is ascertained and sent to the central database. For example, the driver, while driving, is monitored for signs of fatigue by a driver observation system. Vital data such as these are then saved together with the status data, so that it is possible to differentiate whether an imminent rollover which has been detected could have been prevented if the driver had been paying attention. This provides clues, for example, about prompt output of a warning message to the driver or about failure to output a warning message to the driver if the latter has been paying attention. Alternatively or additionally, the model of the motor vehicle is preferably ascertained, so that the transmitted data may be sorted and filtered according to vehicle type.

The aforementioned advantages may also be achieved through an example method according to the present invention in which the motor vehicle receives information from the central database, which uses it to detect an imminent rollover or to prevent it in the first place. According to the present invention, it is provided here that, depending on the instantaneous position coordinates of the motor vehicle, warning messages and/or status values, which are assigned to these position coordinates and are filed in a central database, having been filed there in particular by the method described previously, are queried in order to detect an imminent rollover, depending on the data queried. The method described here thus uses the status values for motor vehicles, which were already located at the position coordinates where the present motor vehicle is situated, and the status values are stored in the central database. Based on the query of the database, an estimate is made of how the motor vehicle will presumably behave at these position coordinates or at the following position coordinates in the road. Thus, depending in particular on the instantaneous position coordinates of the motor vehicle, upcoming position coordinates of the motor vehicle are ascertained, depending on the instantaneous route, and are used as the basis for the query, so that a prediction is made about the behavior of the motor vehicle with respect to a possible rollover, depending on previous events at these upcoming position coordinates.

It is preferably provided here that the queried status values are compared with the instantaneous status values to detect an imminent rollover or to decide about initiating countermeasures and/or output of a warning message. For example, if the instantaneous status values correspond to the status values filed in the database, countermeasures may be initiated at an early point in time or warning messages may be output. Data filed in the central database are categorized according to the vehicle type in particular, so that the vehicle type is also taken into account in the event of a query of the database.

In addition, it is preferably provided that data on the vehicle surroundings, vital data on the driver and/or the vehicle type are also detected and compared with the data stored in the central database to decide about initiation of at least one countermeasure and/or output of a warning message. As described previously, instantaneous data may be compared with data stored previously to decide whether this situation is like a situation occurring previously, so that a warning message may be output at an early point in time or a countermeasure may be initiated. By taking into account the vehicle type, data relevant for the motor vehicle are filtered out of the stored data.

The device according to the present invention includes a specially equipped control unit, which carries out at least one of the methods according to the present invention. This yields the aforementioned advantages during operation of the motor vehicle. In particular, the advantage achieved is that the instantaneous status data of the motor vehicle are stored in the central database and utilized by other vehicles for early detection of an imminent rollover.

The safety system according to the present invention may include at least one motor vehicle including the device according to the present invention. This yields the advantages already mentioned here. Additional features and advantages are derived from the from the description herein.

The present invention is explained in greater detail below with reference to the FIGURE.

BRIEF DESCRIPTION OF THE DRAWING

The sole FIGURE shows a safety system for operating a motor vehicle in a simplified representation.

DETAILED DESCRIPTION OF EXAMPLE EMBODIMENTS

The FIGURE shows a safety system 1 for motor vehicles in a simplified top view. System 1 has a device 3, which is integrated into a motor vehicle 2, which communicates wirelessly in particular with a central database 4. Device 3, for example, has a radio unit, which establishes a communication link to central database 4 for data exchange via the mobile radio network. Device 3 is a control unit 8 of motor vehicle 2 or has such a control unit 8, for example.

During driving operation of motor vehicle 2, device 3 monitors the status data of motor vehicle 2, in particular the driving speed, the steering angle, the longitudinal acceleration, the transverse acceleration and/or the rotation rate of motor vehicle 2. Device 3 is therefore connected to a control unit of motor vehicle 2, for example, which ascertains the aforementioned data in any case. Device 3 ascertains the risk of a rollover of motor vehicle 2, depending on the detected status values. If motor vehicle 2 negotiates a curve, as shown by an arrow 5 in the FIGURE, then the driving speed, the rotation rate and transverse acceleration of vehicle 2 in particular are detected. With knowledge of the driving speed of motor vehicle 2, device 3 ascertains, depending on the detected acceleration and/or rotation rate, that motor vehicle 2 is in a critical status and that a rollover is imminent. To prevent this, device 3 intervenes in the driving behavior of motor vehicle 2 by activating in particular a braking system 6 of motor vehicle 2 in order to counteract the imminent rollover. This is basically conventional and therefore will not be discussed further here. Device 3 also generates a warning message, which is output acoustically or visually to the driver of vehicle 2, so that the driver himself may also initiate countermeasures.

In the case when device 3 generates a warning message, it is provided in the present case that device 3 transmits status values, which are detected and have resulted in the warning message being output, via the mobile radio network to central database 4, where they are saved together with instantaneous position coordinates of motor vehicle 2, which were detected by a navigation system 7 of motor vehicle 2 and belong to the status values. If necessary, device 3 also transmits data on the surroundings with respect to the instantaneous weather situation, the roadway condition, the time of day and/or the season of the year, to categorize the status values stored in database 4. In particular, the class of vehicle is also transmitted together with the status values, so that the warning message is saved together with the position coordinates of the motor vehicle and the vehicle type.

The data made available in database 4 are used, for example, for statistical analyses pertaining to the safety of routes or roadways. Based on the classified storage of status values, taking into account the vehicle type, data about the surroundings, and also vital data on the driver, the status values in database 4 may advantageously be analyzed, if necessary.

In addition, the data of database 4 from other motor vehicles also participating in safety system 1 are also made available. Other motor vehicles 2, which are also participating in safety system 1, are designed according to motor vehicle 2, described in the present case, and have a corresponding device 3. Depending on the instantaneous position coordinates of motor vehicle 2, device 3 queries database 4 to ascertain whether these position coordinates have already issued warning messages, and therefore whether greater attention is demanded of the driver, for example, or whether countermeasures may or should already be initiated to increase safety. In particular, the data are queried only when the position coordinates reveal that motor vehicle 2 is moving toward a location where a rollover scenario is relevant, such as a curve, for example. Device 3 then compares instantaneous status values of motor vehicle 2 with the status values stored in database 4 for these position coordinates and the same vehicle type, to recognize whether the instantaneous status values have already resulted in a warning message to another motor vehicle. With this simple comparison, a prediction about the behavior of the motor vehicle in a critical situation may be made at an early point in time, so that countermeasures may be taken still more rapidly or in a more targeted manner.

Furthermore, additional information may also be supplied to or from motor vehicle 2 via the communication link to database 4, such information including, for example, information concerning the traffic status, obstacles or accidents, for example, on the actual route or in the surroundings. The length of a traffic jam and travel time may also be indicated.

If more than one rollover warning message occurs at a certain location, for example, on a certain section of road, within predefinable surroundings (parameters of the method), in particular within a predefinable period of time, then these are classified as statistically relevant and the location or the section of road is stored or reported as a danger spot, such as, for example, highway exits or highway curves with an increasingly tight radius, which are often dangerous spots. As already mentioned, then a motor vehicle following later, before reaching this location or section of road, will be warned that critical situations have occurred for other vehicles at this location.

Filtering/presetting for target vehicles is advantageously ensured by device 3, so that, as already indicated, the status values are compared only with stored status values of comparable types of vehicles. Device 3 may also weight the relevance of a stored warning message by the fact that countermeasures are not taken until then and/or a warning message is not output until more than a predefinable number of warning messages has been saved at this location. The instantaneous weather situation and the time of day may also be taken into account.

The warning message to the driver of motor vehicle 2 is preferably issued via a warning message device of motor vehicle 2 itself. Alternatively or additionally, however, it is also possible to provide for the warning message to be transmitted to a mobile device of the driver, such as, for example, a smartphone or the like. This may be, for example, through a separate communication link between cell phone and motor vehicle 2.

Due to the early output of the warning message, the driver is able to reduce his speed, for example, at an early point in time and thereby safely prevent a rollover in the critical section of road. Depending on the stored warning messages, the system preferably ascertains the driving speed at which it is safe to drive through the hazardous location. This speed is then displayed for motor vehicle 2 or to the driver as a recommended speed, which should not be exceeded in order to prevent a rollover and possibly also the initiation of automatic countermeasures such as activation of a braking system, if necessary.

In particular, prefilling or prestressing of the braking system of motor vehicle 2 is provided as an early countermeasure, which may be initiated, depending on the stored warning messages, so that a braking force is generated without any delay in pressure buildup.

If the driver of motor vehicle 2 does not himself intervene in the driving operation, then device 3 preferably controls/regulates braking system 6 in such a way that it decelerates motor vehicle 2 to the previously determined safe driving speed, so that the hazardous situation is automatically mitigated. At the same time, with automated deceleration, the fact that automatic deceleration takes place is displayed for the driver of the motor vehicle, so that the driver is not surprised or irritated by the braking maneuver.

What is claimed is:

1. A method for operating a motor vehicle, comprising:
   detecting an imminent rollover of the motor vehicle;
   in response to instantaneous status values of the motor vehicle: i) initiating at least one countermeasure for physically preventing the imminent rollover through an automatic control of a system of the vehicle without intervention by a human driver of the vehicle, and ii) outputting at least one warning message being output when an imminent rollover is detected, wherein the warning is output in a form that is perceptible to the human driver;
   when an imminent rollover is detected, transmitting, to a central database, at least one of: i) at least one of the instantaneous status values, and ii) the warning message, where the at least one of the instantaneous status values and the warning message is made available for other motor vehicles.

2. The method as recited in claim 1, wherein at least one of: i) position coordinates, ii) a driving speed, iii) a steering angle, and iv) a distance traveled, are detected as the instantaneous status values of the motor vehicle.

3. The method as recited in claim 1, wherein data on surroundings of the vehicle, at least one of: i) weather data, ii) roadway condition, iii) season of the year, and iv) time of day, are additionally detected and transmitted to the central database.

4. The method as recited in claim 1, wherein at least one of: i) vital data on a driver of the motor vehicle, and ii) a type of the motor vehicle, is detected and transmitted to the central database.

5. A device for operating a motor vehicle, comprising:
   a control unit equipped to:
     detect an imminent rollover of the motor vehicle;
     in response to instantaneous status values of the motor vehicle: i) initiate at least one countermeasure for physically preventing the imminent rollover through an automatic control of a system of the vehicle without intervention by a human driver of the vehicle, and ii) output at least one warning message being output when an imminent rollover is detected, wherein the warning is output in a form that is perceptible to the human driver;
     when an imminent rollover is detected, transmit, to a central database, at least one of: i) at least one of the instantaneous status values, and ii) the warning message, where the at least one of the instantaneous status values and the warning message is made available for other motor vehicles.

6. A safety system for a motor vehicle, comprising:
   a central database; and
   a device assigned to the motor vehicle, the device including a control unit equipped to:
     detect an imminent rollover of the motor vehicle;
     in response to instantaneous status values of the motor vehicle: i) initiate at least one countermeasure for physically preventing the imminent rollover through an automatic control of a system of the vehicle without intervention by a human driver of the vehicle, and ii) output at least one warning message being output when an imminent rollover is detected, wherein the warning is output in a form that is perceptible to the human driver;
     when an imminent rollover is detected, transmit, to the central database, at least one of: i) at least one of the instantaneous status values, and ii) the warning message, where the at least one of the instantaneous status values and the warning message is made available for other motor vehicles.

* * * * *